J. W. JONES.
ATTACHMENT FOR SPEEDOMETERS.
APPLICATION FILED AUG. 13, 1906.
908,775.
Patented Jan. 5, 1909.
2 SHEETS—SHEET 2.
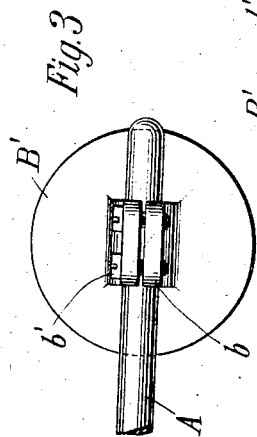
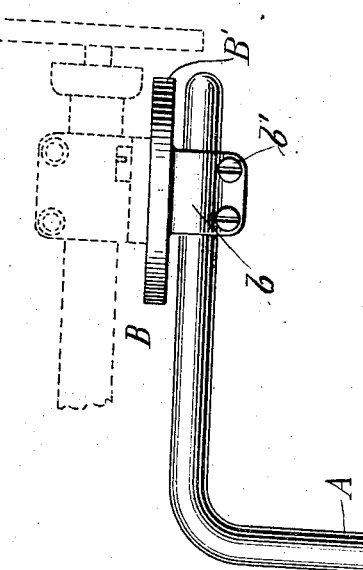
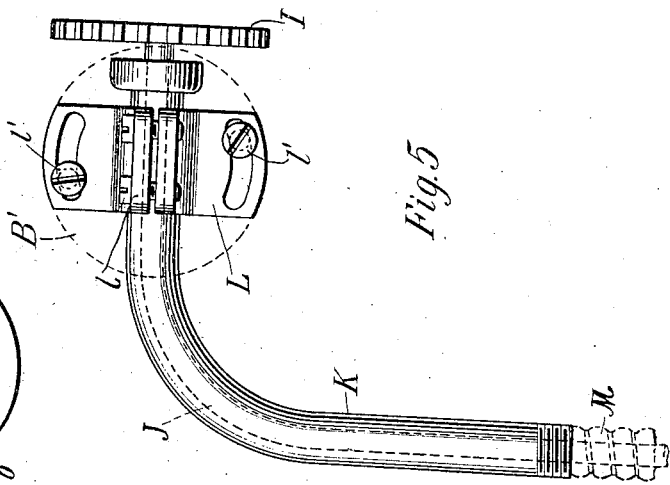
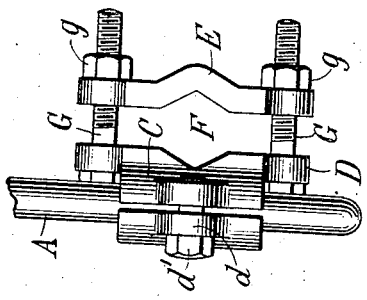
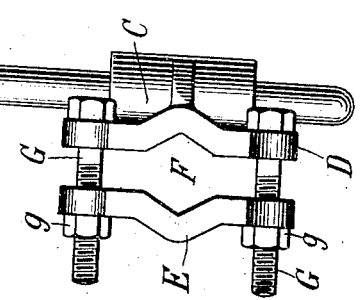
Witnesses
Joseph W. Jones, Inventor

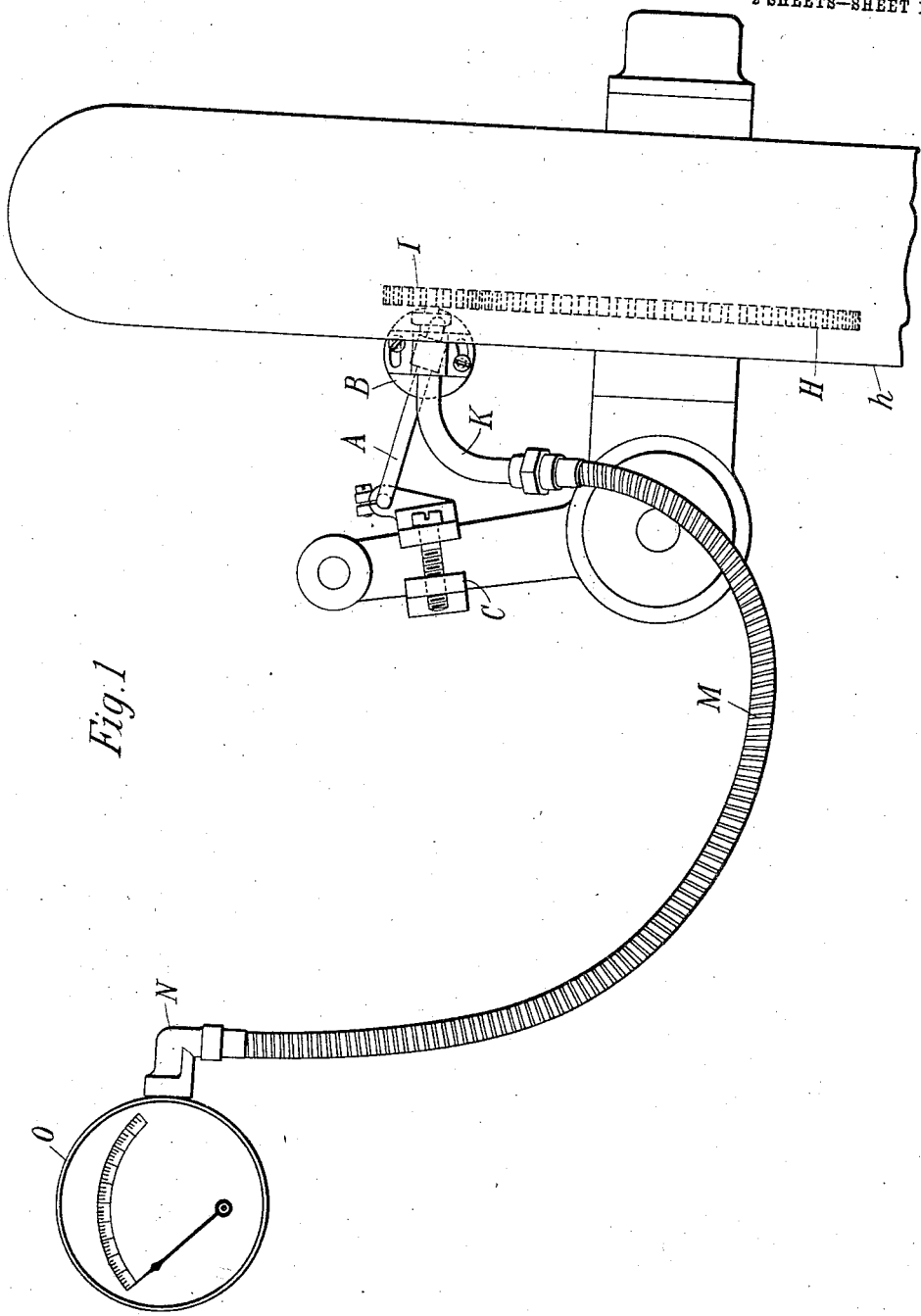

UNITED STATES PATENT OFFICE.

JOSEPH W. JONES, OF NEW YORK, N. Y.

ATTACHMENT FOR SPEEDOMETERS.

No. 908,775.

Specification of Letters Patent.

Patented Jan. 5, 1909.

Application filed August 13, 1906. Serial No. 330,361.

*To all whom it may concern:*

Be it known that I, JOSEPH W. JONES, a citizen of the United States of America, and a resident of New York city, New York, have invented a new and useful Improvement in Attachments for Speedometers, which improvement is fully set forth in the following specification.

This invention relates to speedometers and consists of means for attaching the same to a vehicle, as for instance, the attachment of a speedometer to an automobile as described in my Patent No. 765,841, July 26, 1904. Such apparatus comprises the instrument itself, a gear carried upon one of the vehicle wheels of the automobile, and a flexible shafting driven by the gear and serving to actuate the instrument. The instrument itself is generally placed upon the dashboard of the automobile, and in plain sight of the chauffeur; while the flexible shafting terminates in a gear that meshes with another gear carried by the vehicle wheel. The outer end of the flexible shafting adjacent its gear is generally mounted upon the steering knuckle or the stub axle of one of the vehicle wheels. There are innumerable makes of automobiles, and the same manufacturer will have different styles, types, and sizes, each of which may have a different arrangement or proportioning of these parts; so that heretofore, speaking generally, each size and make of vehicle requires special provision to be made for attaching the outer end of the flexible shafting.

The particular object of the present invention is to provide a universally adjustable bracket for carrying the gear of the flexible shafting in proper relation to the corresponding gear upon the automobile wheel.

The invention will be best understood by reference to the accompanying drawings that illustrate preferred embodiments thereof, in which—

Figure 1 is a diagrammatic view indicating the parts of my invention applied to an automobile carrying a "Jones speedometer"; Fig. 2 is an elevation, from the rear, of the adjustable bracket of the steering-knuckle or the like; Figs. 3 and 4 are details relating to the same; and Fig. 5 is a plan of the outer end of the flexible shafting and its gear, showing the angular tubing for the same.

Referring to Fig. 2, A represents a rod formed into a right angle, and carrying on each member the bracket-members B and C as indicated. The rod A may be curved, and the two members may be at some other angle than 90°. Bracket-member B consists of a flat plate or disk B' having a split bearing $b$ that surrounds the horizontal member of the rod A, upon which it may be clamped and adjusted by the small screws $b'$. This bracket-member is capable of adjustment upon the rod A both axially and longitudinally. Bracket-member C comprises a plate D having a split bearing $d$ that surrounds the other member of the angular rod A, upon which it is clamped by the screw $d'$; while opposing the plate D is a similar plate E, in the opposing faces of which are the similar recesses F, while the two plates are connected by the two bolts G, G, provided with nuts $g$. The two plates D and E are adapted to embrace a suitable portion (such as the lever-arm) of the steering-knuckle or stub-axle, or other suitable part, and are clamped thereon by the bolts and nuts. The bracket C as a whole is capable of both axial and longitudinal adjustment upon the angular rod A. The adjustments, both angular and linear, of this device as a whole—consisting of the parts A, B and C,—are innumerable. Inasmuch as the gear H (Fig. 1) carried by the vehicle wheel $h$ lies in the plane of the wheel (a vertical plane), the gear I at the end of the flexible shafting J must lie in this same vertical plane; consequently, its axis (lying at right-angles thereto) must be in a horizontal line. Therefore, the bracket B has only to be so arranged that the axis of gear I may be horizontal, and at right angles to the vertical plane of the vehicle wheel. When this has been provided, the other parts of the device may be adjusted in any manner whatever so as to make the proper connection with a suitable portion of the steering-knuckle or other part of the vehicle.

Referring again to Fig. 1, it will be seen that the flexible shafting has to make two changes of direction, each an approximate right angle, first, in coming from the gear I, and, second, in approaching the instrument O itself. According to my present construction, at these two locations I substitute rigid sheathing in place of flexible sheathing.

Referring to Fig. 5, K represents an angular or curved tubing which is clamped in the split bearing $l$ of plate L, which latter in turn is secured upon the plate B' by screws l' through curved slots in plate L. At the rear end of the bent tube K is screwed or otherwise secured the ordinary flexible shafting M.

Referring to Fig. 1, N represents an angular or curved casting having a bore considerably larger than the flexible shafting it is to carry, and operating to change the direction of the latter from that in which it enters the instrument—horizontal and transversely of the vehicle—into one at substantially right angles thereto,—either forward or rearward, or downward or upward, as may be desired in order to make the best connection with the parts adjusted to the wheel of the vehicle.

What is claimed is:—

1. The combination, in an automobile or other vehicle, of a gear associated with one of the wheels thereof, a bracket for supporting a speedometer gear and its shaft in position to be driven by engagement with said first named gear, said bracket comprising a rod having a bend or angle therein whereby the ends of the rod extend in different directions, a clamp-member having clamping means adapted to engage a part of the vehicle in proximity to its said wheel and other clamping means adapted to engage said rod at one end and secure the same in any position of linear or angular adjustment, a plate or support having clamping means engaging the other end of said rod to secure the plate in any position of linear or angular adjustment, and bearing means on said support in which said speedometer gear shaft is journaled.

2. The combination, in an automobile or other vehicle, of a gear associated with one of the wheels thereof, a bracket for supporting a speedometer gear and its shaft in position to be driven by engagement with said first named gear, said bracket comprising a rod having a bend or angle therein whereby the ends of the rod extend in different directions, a clamp-member having clamping means adapted to engage a part of the vehicle in proximity to its said wheel and other clamping means adapted to engage said rod at one end and secure the same in any position of linear or angular adjustment, a plate or support having clamping means engaging the other end of said rod to secure the plate in any position of linear or angular adjustment, and bearing means angularly adjustable on said support and in which said speedometer gear shaft is journaled.

3. The combination, in an automobile or other vehicle, of a gear associated with one of the wheels thereof, a bracket for supporting a speedometer gear and its shaft in position to be driven by engagement with said first named gear, said bracket comprising a rod having a bend or angle therein whereby the ends of the rod extend in different directions, a clamp member comprising two plates and means for connecting and drawing said plates together to securely embrace therebetween a part of the vehicle in proximity to its said wheel, one of said plates having a split bearing and means for contracting said bearing to securely clamp said rod at one end in any position of linear or angular adjustment in said bearing, a bearing in which said speedometer gear shaft is journaled, a support for said bearing, and means for securely clamping said support to the other end of said rod in any position of linear or angular adjustment thereon.

4. The combination, in an automobile or other vehicle, of a gear associated with one of the wheels thereof, a bracket for supporting a speedometer gear and its shaft in position to be driven by engagement with said first named gear, said bracket comprising a rod having a bend or angle therein whereby the ends of the rod extend in different directions, a clamp-member having clamping means adapted to engage a part of the vehicle in proximity to its said wheel and other clamping means adapted to engage said rod at one end and secure the same in any position of linear or angular adjustment, a plate having a split bearing embracing the other end of said rod and means for contracting said bearing to grip the rod and securely hold the plate in any position of linear or angular adjustment thereon, and a second plate angularly adjustable on said first-named plate and carrying a bearing in which said speedometer gear shaft is journaled.

In testimony whereof I have signed this specification in the presence of two subscribing witnesses.

JOSEPH W. JONES.

Witnesses:
R. L. SCOTT,
ACHSAH H. TAYLOR.